(12) United States Patent
Grossman et al.

(10) Patent No.: US 6,406,584 B1
(45) Date of Patent: Jun. 18, 2002

(54) PROCESS FOR MAKING VERTICALLY INTEGRATED OPTICAL COMPONENTS

(75) Inventors: David G. Grossman, Corning; Larry G. Mann, Painted Post; Vincent A. Rice, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/437,544

(22) Filed: Nov. 10, 1999

(51) Int. Cl.⁷ .................. B32B 31/00; G02B 6/00
(52) U.S. Cl. .............. 156/254; 156/154; 156/267; 385/147; 385/141; 359/352; 359/896; 359/900
(58) Field of Search ................... 156/154, 254, 156/267; 385/147, 141; 359/352, 896, 900

(56) References Cited

U.S. PATENT DOCUMENTS

| | | | |
|---|---|---|---|
| 3,325,299 A | 6/1967 | Araujo et al. | 501/13 |
| 4,304,584 A | 12/1981 | Borrelli et al. | 65/30.11 |
| 4,479,819 A | 10/1984 | Borrelli et al. | 65/30.11 |
| 5,045,509 A | 9/1991 | Kiefer | 501/59 |
| 5,275,979 A | 1/1994 | Borrelli et al. | 501/13 |
| 5,281,562 A | 1/1994 | Araujo et al. | 501/32 |
| 5,300,465 A | 4/1994 | Grateau et al. | 501/13 |
| 5,322,819 A | 6/1994 | Araujo et al. | 501/13 |
| 5,345,545 A * | 9/1994 | Uemiya et al. | 385/141 |
| 5,430,573 A | 7/1995 | Araujo et al. | 359/361 |

FOREIGN PATENT DOCUMENTS

| | | |
|---|---|---|
| EP | 0 719 741 | 7/1996 |
| JP | 4-234710 | * 8/1992 |
| JP | 04-279337 | 10/1992 |
| JP | 05-208844 | 8/1993 |

OTHER PUBLICATIONS

"Light Propagation Along Periodic Metal–Dielectric Layers," Kawakami, S., *Applied Optics*, vol. 22, No. 16, Aug. 15, 1983, pp. 2426–2428.
"Vertical Integration Technology for Fiber–Optic Circuit," Shiraishi, K. et al., *Optoelectronics*, vol. 10, No. 1, Mar. 1995, pp. 55–74.

* cited by examiner

*Primary Examiner*—Linda Gray
(74) *Attorney, Agent, or Firm*—Milton M. Peterson; Anca C. Gheorghiu

(57) ABSTRACT

A process for making a plurality of vertically integrated optical components including providing a holding device with a plurality of holes, providing a polarizing glass having two polarization layers separated by a non-polarizing region, providing a plurality of optical fibers insulated by ferrules, inserting the fibers into the device, bonding the polarizing glass to the fibers and holding device, removing one of the polarization layers and the non-polarizing region to expose the other polarization layer thus forming an ultrathin polarizing glass, slicing the ultrathin glass at the ferrules to form a plurality of polarizer devices, separating the polarizing devices from the surrounding ultrathin glass to form a plurality of vertically integrated optical components, and removing the components from the holding device.

23 Claims, 4 Drawing Sheets

PROCESS FOR MAKING VERTICALLY INTEGRATED OPTICAL COMPONENTS

BACKGROUND OF THE INVENTION

1. Technical Field

The present invention relates to vertically integrated optical components, and in particular to a process for making simultaneously a plurality of vertically integrated optical components which combines the manufacture of ultrathin polarizing glass and attachment of polarizer devices made from ultrathin polarizing glass to optical fibers.

2. Description of Related Art

The use of very thin polarizing glass devices makes it possible to produce optical components without the need for expensive lens elements and more importantly, lessen alignment problems in order to maintain high light throughput. Very thin polarizers can replace lens elements which collimate and refocus the light which exits and re-enters the optical fibers carrying the signal. Very thin polarizers are required, however, preferably around 30 µm, to shorten the optical pathlength to decrease diffraction losses. These, and other aspects of vertical integration technology are described by Shiraishi et al., in "Vertical Integration Technology for Fiber-Optic Circuit", Optoelectronics, Vol. 10, No. 1, pp. 55–74, March 1995.

An example of a polarizing glass, POLARCOR™ is available from Corning Incorporated, Corning, NY. This product is available in planar shapes with dimensions up to 30 mm parallel to the major principal transmission direction. POLARCOR™ products are also available in thickness as low as 200 µm.

U.S. Pat. Nos. 3,325,299, 4,479,819, 5,430,573, 5,322,819, 5,300,465, 5,281,562, 5,275,979, 5,045,509, JP 4-279337, JP 5-208844 and EP 0719 741 all describe glass articles which are polarizing in the infrared region. JP 4-279337 and JP 5-208844 describe a copper-based polarizing glass which, according to the patent application can measure less than 240 µm in thickness. However, the examples were limited to glass thickness in the range of 100 to 1000 µm.

PCT Application Serial No. PCT/US99/07521 entitled "Ultrathin Glass Polarizers and Method of Making Same", having as inventors Borrelli et al., assigned to the instant assignee, discloses a process by which polarizing glass can be thinned down to form an ultrathin polarizing glass measuring less than 50 µm, preferably between about 10–40 µm.

However, even with the attainment of ultrathin polarizing glass devices there exits the difficulty of attaching these devices to optical fibers. Conventionally, attachment is performed manually by individually attaching each polarizing device to an optical fiber endface. This manual process is not only labor-intensive and inefficient, but also costly—costs which are ultimately translated to the end consumer. Further, there is extensive manipulation of the polarizing glass devices and optical fibers, which increases the possibility of contamination and damage.

Therefore, there exists the need for a process which simplifies both the manufacture ultrathin polarizing glass and attachment of polarizer devices made from ultrathin polarizing glass to optical fibers in the formation of vertically integrated optical components.

SUMMARY OF THE INVENTION

Accordingly, it is an object of the present invention to reduce and eliminate the above-mentioned difficulties by providing an approach which combines the manufacture and the attachment of polarizer devices made from ultrathin polarizing glass to optical fibers. It is a further object of the present invention to provide a process that is expedient and cost-efficient by incorporating mass-production techniques.

Other objects and advantages of the present invention will be apparent from the following description.

In accordance with the present invention, there is provided a process for making simultaneously a plurality of vertically integrated optical components which combines the manufacture and attachment of polarizer devices made from ultrathin polarizing glass to optical fibers. In one embodiment of the present invention the process comprises the steps of:

providing a holding device having a plurality of holes for receiving a plurality of optical fibers insulated by ferrules, providing a polarizing glass comprising a first polarization layer and a second polarization layer, where the first polarization layer and the second polarization layer are separated by an inner non-polarizing region, providing a plurality of optical fibers insulated by ferrules, inserting said plurality of optical fibers insulated by the ferrules into said holding device;

bonding said polarizing glass to said holding device and said plurality of optical fibers insulated by the ferrules, forming an ultrathin polarizing glass by removing the second polarization layer and the non-polarizing region of the polarizing glass to expose the first polarization layer, slicing the ultrathin polarizing glass at the ferrule interface to form a plurality of polarizer devices, separating the polarizer devices attached to the optical fibers insulated by the ferrules from the surrounding ultrathin polarizing glass to form a plurality of vertically integrated optical components, and removing said plurality of vertically integrated optical components from said holding device.

Each vertically integrated optical components comprises a polarizer device and an optical fiber insulated by a glass ferrule.

In a variation of the above described process the optical fibers are bonded to the polarizer devices subsequent to the slicing operation and removal of the parts from the holding device.

In another embodiment the process for making simultaneously a plurality of vertically integrated optical components comprising the steps of providing a polarizing glass comprising a first polarization layer, a second polarization layer, and an inner non-polarizing region separating the first and the second polarization layers, providing a glass substrate comprising a plurality of holes, bonding the glass substrate to the polarizing glass, providing a plurality of optical fibers equal to the number of holes in the glass substrate, inserting the optical fibers in the holes, bonding the optical fibers to the polarizing glass, removing the second polarization layer and the non-polarizing region from the polarizing glass to expose the first polarization layer, such that an ultrathin polarizing glass is formed, cutting the glass substrate and the ultrathin polarizing glass around each of the optical fibers to form a plurality of vertically integrated optical component.

BRIEF DESCRIPTION OF THE DRAWINGS

The invention will be further described in conjunction with the attached drawings in which.

Figure 1:
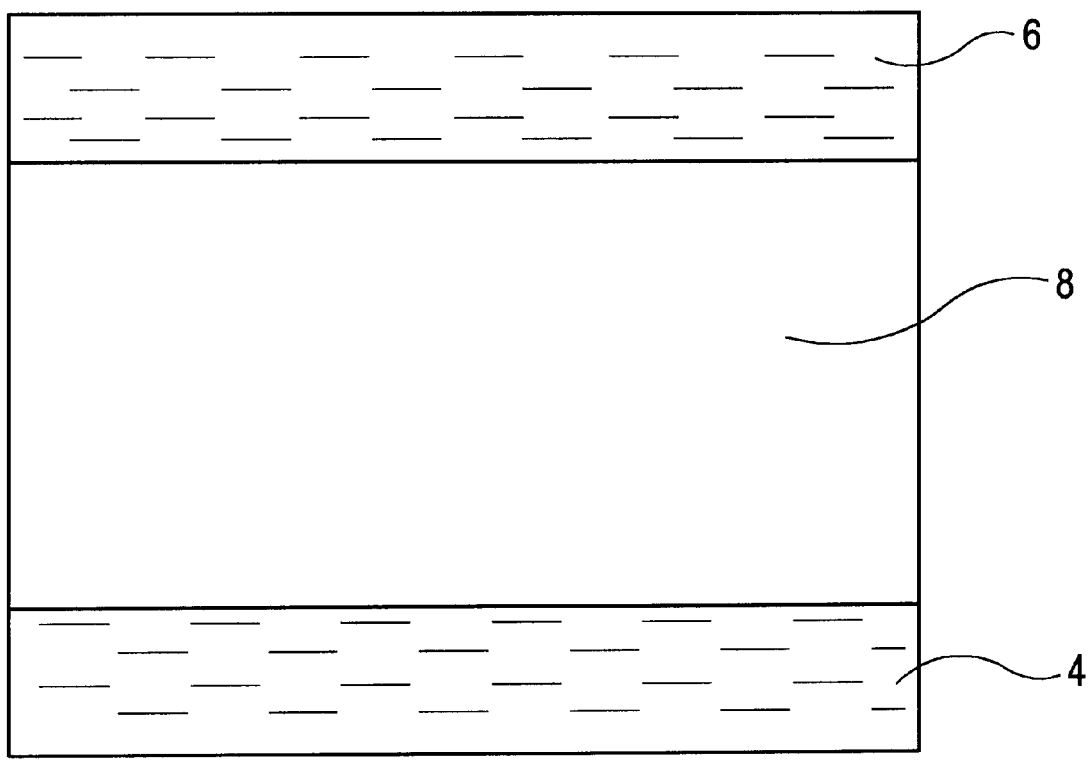
FIG. 1 shows a cross-sectional diagram of a polarizing glass suitable for the present invention.

The accompanying drawings are included to provide a further understanding of the invention and are incorporated in and constitute a part of this specification, illustrate one embodiment of the invention and together with the description serve to explain the principles of the invention. In the drawings, like reference characters denote similar elements throughout the several views. It is to be understood that various elements of the drawings are not intended to be drawn to scale, but instead are sometimes purposely distorted for the purposes of illustrating the invention.

DETAILED DESCRIPTION OF THE PREFERRED EMBODIMENTS

Referring now to FIG. 1 therein is shown a cross-sectional diagram of a polarizing glass 2, more specifically POLARCOR™ glass, which can be used in the present invention to produce ultrathin polarizing glass for direct attachment to a fiber endface. POLARCOR™ glass 2 has a first polarization layer 4, and a second polarization layer 6 separated by an inner non-polarizing region 8.

The first polarization layer 4 and the second polarization layer 6 contain elongated silver or other metallic crystals aligned along a common axis. These metallic crystals preferentially absorb the polarization component of light that parallels the long axis of the crystals but allow high transmittance of light which vibrates perpendicular to that axis. The polarizing layers are formed by exposing a stretched glass body containing elongated metal halide crystals to a reducing environment at temperatures below the annealing point of the glass. The polarizing layers are from 25 to 50 $\mu$m in depth depending on the time, temperature and pressure used during manufacture by diffusing the reducing species (usually hydrogen) into the precursor material.

The inner non-polarizing region 6 contains small unreduced metal halide crystals, such as AgCl or CuCl, which are also elongated or asymmetric in shape. These crystals, however, do not have free electrons available to interact with the electric vector of the transmitted light and therefore, do not contribute to the polarizing performance of the device.

U.S. Pat. No. 4,304,584 to Borrelli, which is hereby incorporated by reference in its entirety, describes the production of glasses exhibiting polarizing properties, i.e., glasses displaying dichroic ratios up to 40 and higher, from two types of silver-containing glasses: (1) phase separable glasses and (2) glasses demonstrating photochromic behavior because of the presence of particles of a silver halide such as AgCl, AgBr, and AgI. The method for preparing the polarizing glasses contemplates two fundamental steps: (a) elongating the base glass under stress to become elongated and aligned in the direction of the stress, and (b) heat treating the elongated glass in a reducing environment at a temperature below the annealing point of the glasses, but above 300° C. Suitable elongation methods include drawing, extruding, redrawing, rolling, or stretching at temperatures between the annealing point and softening point of the glasses to form glass phases in the phase separable glasses or the silver halide particles in the photochromic glasses. Heat treating is carried out under conditions effective to reduce at least a portion of the silver ions in the glass to metallic silver which is deposited in at least one of the elongated glass phases and/or along the phase boundaries of the elongated glass phases and/or upon the elongated silver halide particles. Preferably, heat treatment is carried out at a temperature between about 375–450° C. in a hydrogen atmosphere. As a result, polarization was discerned in the visible and near infrared portions of the radiation spectrum.

In the case of phase separable, non-photochromic glasses, the operable compositions are in the alkali metal aluminoborosilicate field. Thus, suitable glasses will commonly contain, in weight percent, about 5–12% alkali metal oxide, 20–35% $B_2O_3$, 1–15% $Al_2O_3$, and the remainder $SiO_2$. However, where $Al_2O_3$ is included in amounts in excess of 5%, a specific phase separation agent such as CdO and/or F must be present at a level of at least 1%.

The base composition of an operable photochromic glass is essentially immaterial so long as AgCl and/or AgBr and/or AgI constitute the photochromic agents, although large amounts,.10% by weight total, of PbO and/or other readily-reducible metal oxides will be avoided.

In one embodiment (FIG. 2) a POLARCOR™ glass plate 2 is bonded to a holding device 20, using art-known UV-curable adhesive or resin. Preferably, glass plate 2 is about 15 mm×15 mm in size. A key aspect of the present invention is that a plurality of ultrathin polarizer devices can be produced and attached to a plurality of optical fibers at the same time. Holding device 20 has a dual role. In one aspect, holding device 20 is used to fixture a plurality of optical fibers to the POLARCOR™ glass plate. In another aspect, holding device 20 acts as a substrate for the thinning process herein described below.

Figure 2I:
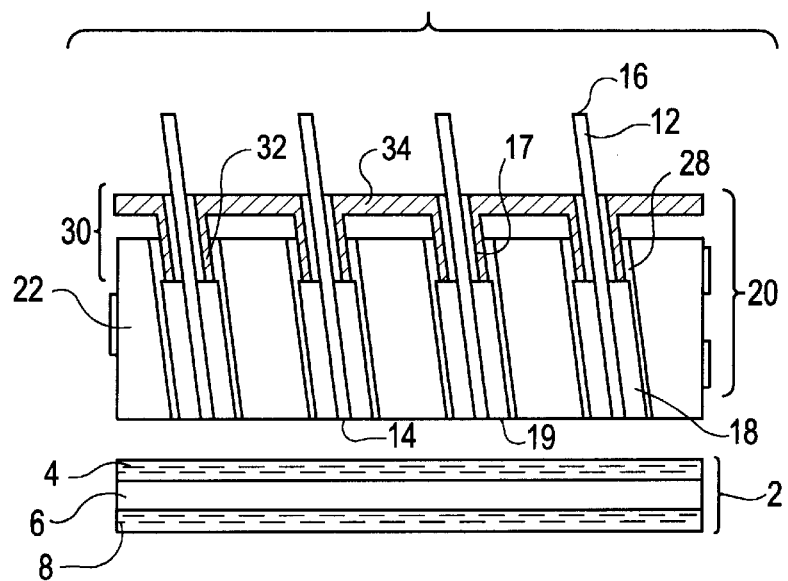
FIG. 2 shows a schematic diagram of an embodiment of the process of the present invention.
Figure 2I:
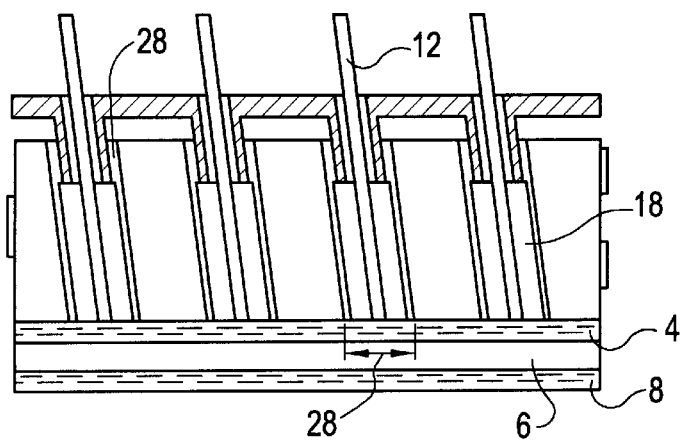
Figure 2I:
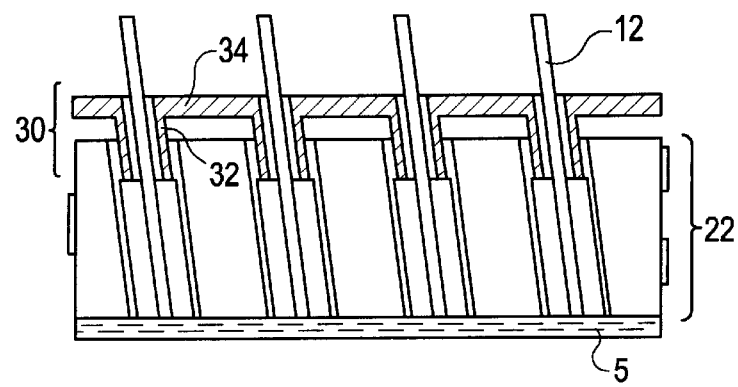
Figure 3:
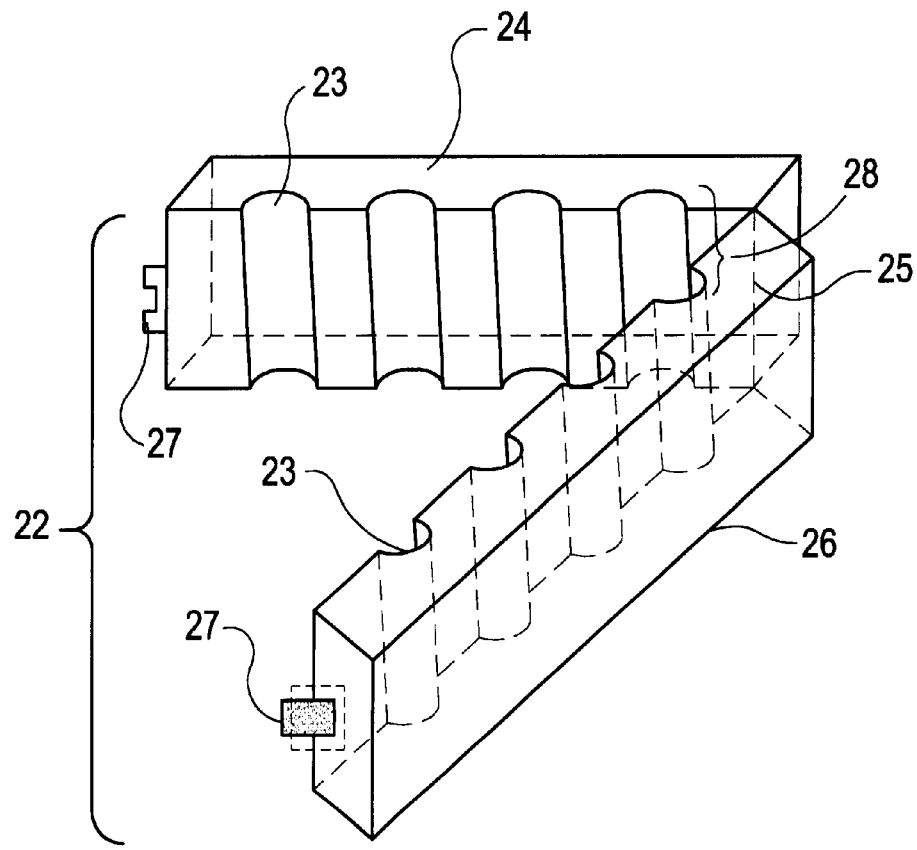
FIG. 3 shows a plan view of the base portion of the holding device used in the process embodiment of FIG. 2.

Still referring to FIG. 2, therein illustrated also is holding device 20 which has two components: base 22 and lid 30. Base 22 (see FIG. 3) is preferably made of a metal, such as stainless steel, and has a first section 24 and a second section 26. Both first section 24 and second section 26 contain a plurality of grooves 23 which match to form holes 28, when first section 24 and second section 26 are closed. First section 24 and second section 26 are held together with hinge 25 and closure of the two section is made with latch 27.

Optical fibers 12 insulated by ferrules 18 are inserted into holes 28.(see FIG. 2-I). Ferrules 18 as known in the art, are made of glass tubing having an aperture for receiving an optical fiber. Ferrule 18 provide both stability and protection for optical fibers 12, and have open tops 17 and ferrule end faces 19.

Holes 28 which are slightly larger than ferrules 18 are drilled at an angle of about 6°–9° to ensure fiber end faces 14 and ferrule end faces 19 are at a slight angle with respect to the optical fiber axis. Conventionally, the endfaces of optical fibers are ground and polished to an angle of six to nine degrees with respect to the fiber axis to minimize reflection.

Lid 30 sits atop base 22 and comprises ridges 32 and slots 34. Lid 30 snaps into place to provide a tight fit with base 22. Ridges 32 are contiguous to ferrules tops 17 and act to hold fiber ferrules 18 in a fixed position during the thinning process and during any grinding and polishing steps. Slots 34 allow an exit for fiber top ends 16. Lid 30 is preferably made of a plastic material such as polypropylene.

After optical fibers 12 insulated by ferrules 18 are placed in holding device 20, fiber end faces 14 and ferrule end faces 19 are ground and polished so that they lie in the same plane as the bottom surface of holding device 20. Thereafter, POLARCOR™ glass plate 2 is bonded thereto (see FIG. 2-II), such that first polarization layer 4 results in achieving intimate contact with fiber end faces 14 and ferrule end faces 19.

In the thinning process POLARCOR™ glass plate 2 is thinned to a thickness of about 30 μm (see FIG. 2-III). During this process, the second polarization layer 6 and the inner non-polarizing layer 8 are removed to expose the first polarization layer 4.

An art-known loose abrasive lapping process can be used in the thinning process to remove second polarization layer 6 and inner non-polarizing layer 8 to a desired thickness and surface finish in preparation for polishing.

First polarization layer 4 is polished to form ultrathin polarizing glass 5. Any known polishing medium can be used for this process such as a cerium oxide polishing wheel. Cleaning with a solution of soap and water follows.

Figure 4:
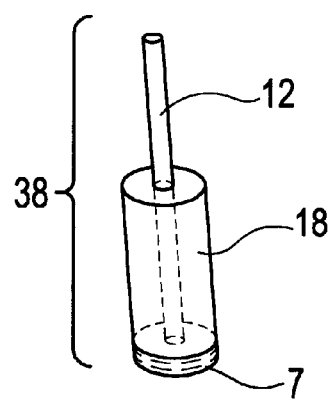
FIG. 4 shows a vertically integrated optical component manufactured with the process embodiment of FIG. 2.

Ultrathin polarizing glass 5 is sliced at the ferrule endface interface to form ultrathin polarizer devices 7 (see FIG. 4). During the slicing operation optical fibers 12 are still in holding device 20. Polarizer devices 7 are attached to optical fibers 12 and ferrules 18 at the end-faces. Conventional laser or ultra-sonic saws are preferred for precision cutting.

After slicing, holding device 20 is opened at latch 27 and each polarizer device 7 attached to optical fiber 12 insulated by ferrule 18 is separated from the surrounding ultrathin polarizing glass 5 and removed from holding device 20 to form simultaneously a plurality of vertically integrated optical components 38.

Each resulting vertically integrated optical component 38 (see FIG. 4) comprises polarizer device 7 and optical fiber 12 insulated by ferrule 18. In the embodiment of FIG. 4, fiber ferrule 18 is round-shaped. However, it is contemplated that square and rectangular ferrules are also suitable in the present invention.

It is also contemplated that optical fibers 12 may be bonded to polarizers 7 after the removal step. More specifically, the entire process is carried out without the optical fibers being present in the ferrules. Hence, after slicing operation, the resulting components consist of a ferrule bonded to a polarizer device. Such components are then removed from the holding device and then each component receives an optical fiber. The optical fiber is inserted through the open top end of the ferrule and bonded to the polarizer with a UV-curable adhesive or resin.

For illustration purposes holding device 20 is shown to have only four holes. It is to be understood however, that the number of holes holding device 20 contains equals the number of vertically integrated optical components 38 that are desired to be produced at one time.

In another embodiment (see FIG. 5) a glass substrate 50, preferably being 15 mm×15 mm×1 mm, is bonded to POLARCOR™ glass plate 2, preferably having 15 mm×15 mm, again using an art-known UV curable resin or wax. Glass substrate 50 has a first end 52 and a second end 54. POLARCOR™ glass plate 2 is bonded to second end 54. Glass substrate 50 is made of a glass material that has a thermal expansion substantially equal to that of the POLARCOR™ glass. Suitable glasses include borosilicate and soda-lime silicate.

Figure 5I:
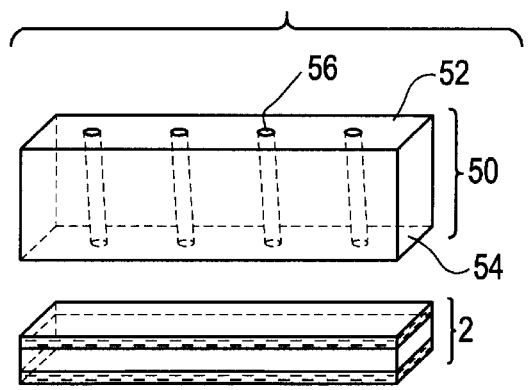
FIG. 5 shows a schematic diagram of another embodiment of the process of the present invention.
Figure 5I:
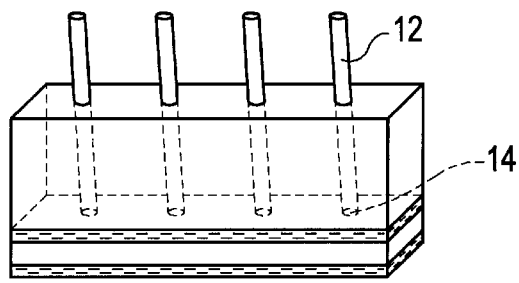
Figure 5I:
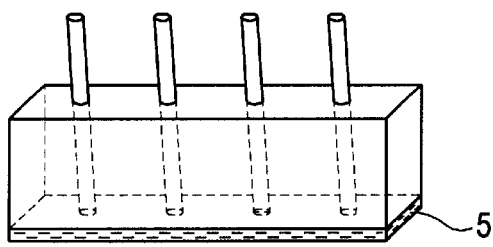

Prior to bonding, a plurality of holes 56 are drilled in glass substrate 50 to a diameter slightly larger than the glass core of the optical fiber (see FIG. 5-I). Holes 56 receive optical fibers 12. In this instance ferrules are not needed to protect and fixture optical fibers 12 as is explained below.

In a glass substrate of preferably 15 mm×15 mm×1–10 mm, up to at least 98 holes are drilled, being able to receive up to at least 98 optical fibers. Again the holes are drilled at an angle of six to nine degrees to provide a tilt of the effective fiber end faces 14 with respect to the optical fiber axis.

Optical fibers 12 are inserted into holes 56 at first end 52 of glass substrate 50 and POLARCOR™ glass plate 2 is bonded thereto with the same. UV curable epoxy as used previously (see FIG. 5-II). POLARCOR™ glass plate 2 is thinned to a desired thickness, preferably about 30 μm using the above thinning technique to form ultrathin polarizing glass 5 (see FIG. 5-III). A polishing process follows, as described above.

Figure 6:
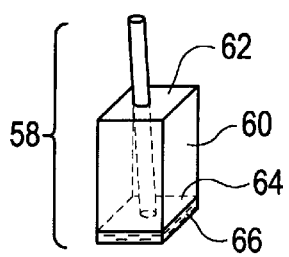
FIG. 6 shows a vertically integrated optical component manufactured with the process embodiment of FIG. 5.

After thinning and polishing, both the glass substrate 50 and the ultrathin polarizing glass 5 are cut using a laser or ultra-sonic saw to form vertically integrated optical components 58 as shown in FIG. 6. Cuts are made in between each of the optical fibers 12 through glass substrate 50 and ultrathin polarizing glass 5 to form preferably rectangularly-shaped components having dimensions of 1 mm×2 mm×1–10 mm. Once glass substrate 50 is cut at each optical fiber 12 it becomes a ferrule 60 having a first end 62 and a second end 64. Second end 64 of ferrule 60 is bonded to polarizer device 66. Hence vertically integrated optical component 58 comprises polarizer device 66 and optical fiber 12 insulated by ferrule 60.

Again it is to be understood that the number of holes in glass substrate 50 equal the number of vertically integrated optical components 58 are desired to be made at a time and in FIG. 5 four are shown but only for illustration purposes.

An advantage of the present invention is that a plurality of vertically integrated optical components can be manufactured simultaneously with little or no handling, resulting in a more cost-efficient and expedient process, replacing the labor-intensive and slow manual process of making vertically integrated optical components one at a time by attaching individual polarizing devices to optical fiber/ferrule components.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A process for making simultaneously a plurality of vertically integrated optical components comprising the steps of:

providing a holding device having a plurality of holes, providing a polarizing glass comprising a first polarization layer and a second polarization layer, said first polarization layer and said second polarization layer being separated by an inner non-polarizing region, providing a plurality of optical fibers insulated by ferrules, inserting said plurality of optical fibers insulated by said ferrules into said holding device;

bonding said polarizing glass to said holding device and said plurality of optical fibers insulated by said ferrules, forming an ultrathin polarizing glass by removing said second polarization layer and said non-polarizing region of said polarizing glass to expose said first polarization layer and optionally polishing the exposed surface of said first polarization layer, slicing said ultrathin polarizing glass at said ferrules to form a plurality of polarizer devices, and, separating said polarizer devices attached to said optical fibers insulated by said ferrules from said surrounding ultrathin polarizing glass to form a plurality of vertically integrated optical components, and, removing said plurality of vertically integrated optical components from said holding device, wherein each of said plurality of vertically integrated optical components comprises an optical fiber insulated by a ferrule and a polarizer device attached to said optical fiber.

2. The process of claim 1 wherein said first polarization layer and said second polarization layer contain elongated metal crystals having a long axis such that said elongated metal crystals preferentially absorb polarization of light that is parallel to said long axis but allow high transmittance of light which vibrates perpendicular to said long axis, and said non-polarizing region contains elongated metal halide crystals, said metal halide crystals lacking free electrons such that the crystals do not interact with electric vector of transmitted light.

3. The process of claim 2 wherein said elongated metal crystals in said first polarization layer and said second polarization layer are silver.

4. The process of claim 1 wherein said removing of said second polarization layer and said non-polarizing region is achieved with a loose abrasive lapping process.

5. The process of claim 1 wherein said holding device comprises a base and a lid contiguous to said base.

6. The process of claim 5 wherein said base comprises said plurality of holes.

7. The process of claim 5 wherein said base is made of metal.

8. The process of claim 7, wherein said base is made of stainless steel.

9. The process of claim 5 wherein said lid is made of plastic.

10. The process of claim 9, wherein said lid is made of polypropylene.

11. The process of claim 1 wherein said holes are formed at an angle of 6°–9° with respect to the end faces of said glass fibers.

12. The process of claim 1 wherein said ultrathin polarizing glass has a thickness of between 10–50 $\mu$m.

13. The process of claim 12 wherein said ultrathin polarizing glass has a thickness of about 30 $\mu$m.

14. A process for making simultaneously a plurality of vertically integrated optical components comprising the steps of:

providing a holding device having a plurality of holes, providing a polarizing glass comprising a first polarization layer and a second polarization layer, said first polarization layer and said second polarization layer being separated by an inner non-polarizing region, providing a plurality of ferrules having an open top end, inserting said plurality of ferrules into said holding device;

bonding said polarizing glass to said holding device and said plurality of ferrules, forming an ultrathin polarizing glass by removing said second polarization layer and said non-polarizing region of said polarizing glass to expose said first polarization layer, and optionally polishing the exposed surface of said first polarization layer, slicing said ultrathin polarizing glass at said ferrules to form a plurality of polarizer devices, separating said polarizer devices and said glass ferrules from said surrounding ultrathin polarizing glass, and, removing said polarizer devices attached to said glass ferrules from said holding device, providing a plurality of optical fibers each having a top end and an end-face, inserting said optical fibers into said open top ends of said glass ferrules, and, bonding said end-face of each said plurality of optical fibers to said polarizer devices attached to said glass ferrules to form a plurality of vertically integrated optical components, wherein each of said plurality of vertically integrated optical components comprises an optical fiber insulated by a ferrule and a polarizer device attached to said optical fiber.

15. A process for making simultaneously a plurality of vertically integrated optical component comprising the steps of:

providing a polarizing glass comprising a first polarization layer and a second polarization layer, said first polarization layer and said second polarization layer being separated by an inner non-polarizing region, providing a glass substrate comprising a plurality of holes, bonding said glass substrate to said polarizing glass, providing a plurality of optical fibers equal to the number of holes in said glass substrate, inserting said optical fibers in said holes, bonding said optical fibers to said polarizing glass, removing said second polarization layer and said non-polarizing region of said polarizing glass to expose said first polarization layer and optionally polishing the exposed surface of said first polarization layer, forming an ultrathin polarizing glass, and, cutting said glass substrate and said ultrathin polarizing glass between each said optical fibers to form a plurality of vertically integrated optical components.

16. The process of claim 15 wherein said first polarization layer and said second polarization layer contain elongated metal crystals having a long axis such that said elongated metal crystals preferentially absorb polarization of light that is parallel to said long axis but allow high transmittance of light which vibrates perpendicular to said long axis, and said non-polarizing region contains elongated metal halide crystals, said metal halide crystals lacking free electrons such that the crystals do not interact with electric vector of transmitted light.

17. The process of claim 15 wherein said glass substrate is borosilicate.

18. The process of claim 15 wherein said glass substrate is soda-lime silicate.

19. The process of claim 15 wherein said glass substrate has dimensions of 15 mm×15 mm×1–10 mm.

20. The process of claim 15 wherein said bonding is achieved with an ultraviolet curing epoxy.

21. The process of claim 15 wherein said elongated metal crystals in said first polarization layer and said second polarization layer are silver.

22. The method of claim 15 wherein said ultrathin polarizing glass has a thickness in the range of 10–50 $\mu$m.

23. The method of claim 22 wherein said ultrathin polarizing glass has a thickness of about 30 $\mu$m.

* * * * *